United States Patent Office 3,456,651
Patented July 22, 1969

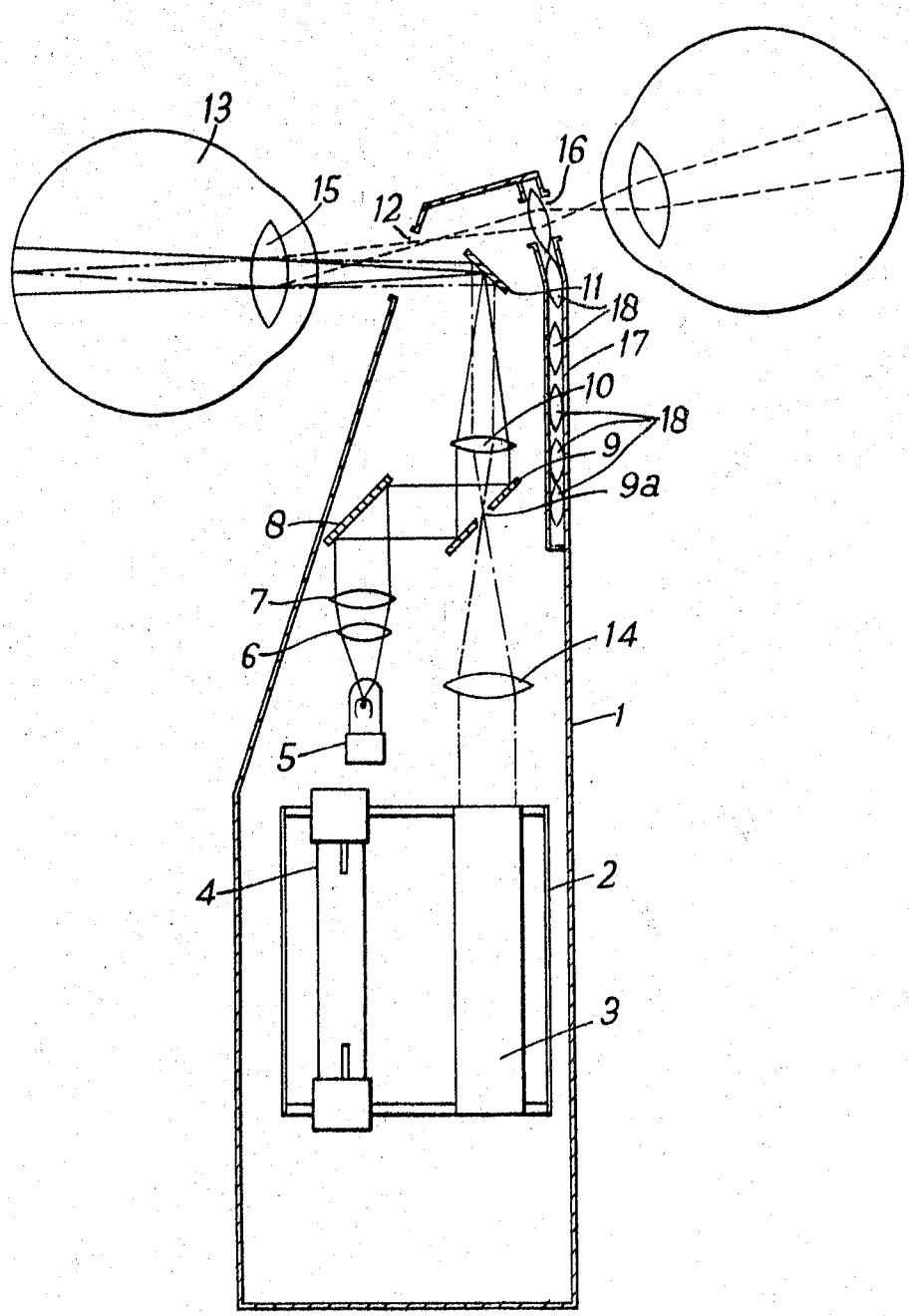

3,456,651
INSTRUMENT FOR THE MEDICAL TREATMENT OF HUMAN AND ANIMAL TISSUE USING LASERS
Desmond Smart, Newcastle-upon-Tyne, England, assignor to International Research & Development Company, Limited, Newcastle-upon-Tyne, England
Filed Jan. 3, 1967, Ser. No. 606,750
Claims priority, application Great Britain, Jan. 7, 1966, 931/66
Int. Cl. A61b *17/36*
U.S. Cl. 128—303.1                                   7 Claims

ABSTRACT OF THE DISCLOSURE

A laser ophthalmoscope having an optical system including a reflector with a light-transmitting region for removing part of the illuminating beam to form an unilluminated aiming spot within the area illuminated by the beam, the laser beam being substituted for the removed part of the illuminating beam and brought to a focus within the aiming spot by the same optical system.

---

This invention relates to instruments for the medical treatment of human and animal tissue using lasers. It is particularly though not exclusively concerned with laser ophthalmoscopes for the treatment of the eye.

The conventional use for an ophthalmoscope is for inspection of the retina of the eye, but recently ophthalmoscopes have been developed using lasers, which can be used not only for inspection but also for treatment of the eye by directing a laser beam onto tissue associated with the eye. In the case of a detached retina for example, the laser beam can be used to "spot weld" the detached retina to the wall of the eye.

Such instruments commonly incorporate an optical system for focussing a light beam on the eye for the purpose of establishing an aiming mark for the laser beam, and optical means for directing the laser beam onto the aiming mark. Movement of any component in the optical system can lead to a condition where the laser beam and aiming mark no longer coincide with possible damage to tissue being treated.

In accordance with the present invention there is provided an instrument for laser-beam treatment including a laser, a light source, and an optical system designed to illuminate a target area with a beam of light from the light source, the optical system including a reflector having a light-transmitting region arranged to remove part of the illuminating beam to produce an unilluminated aiming spot within the illuminated area, the laser beam being brought to a focus in the light-transmitting region and directed to follow the same optical path as the illuminating beam whereby the laser beam and the aiming spot are brought to a common focus.

The reflector may be a plane mirror with an aperture therein through which the laser beam passes, the mirror being disposed at an angle to the axis of the laser beam to reflect a parallel light beam from the source along the same path as the laser beam.

The instrument can include an observation aperture and a rack of lenses for positioning in the observation aperture to correct eye defects of the patient and/or the observer and enable the target area to be observed. The observation aperture should be so positioned that light from the laser beam will not reach the observer's eye.

The invention will now be further described with the aid of an example illustrated in the accompanying drawing, which shows the optical head of a laser ophthalmoscope.

In carrying the invention into effect in the form illustrated by way of example a laser ophthalmoscope comprises a casing 1 housing a laser cavity 2 in which are located a laser rod 3 and flash tube 4. The laser rod is preferably a ruby laser rod and the flash tube can be any type commonly used with solid lasers, for example, a xenon arc flash tube. The electrical circuitry connected to the flash tube has not been shown as this is of known form and constitutes no part of the invention.

In addition to the laser rod, the ophthalmoscope also incorporates a light source 5 which in the form shown is a filament lamp.

Optical means are provided to bring a beam of light from the source 5 into the path of the beam from laser 3 so that the optical axes of the beams coincide or substantially coincide. These optical means, in the form shown, comprise collimating lenses 6 and 7 which form a parallel beam from light emitted by source 5. It is not however, essential to use two lenses for collimating purposes. The parallel beam from lens 7 is received by flat mirror or reflector 8, and directed on to a flat mirror or reflector 9 which lies in the path of the laser beam, but is at an angle to the optical axis of the laser beam.

From the mirror or reflector 9 the beam passes to lens 10 which brings the light beam to a focus on a mirror or reflector 11 from which the light is directed via an outlet aperture 12 onto the patient's eye 13.

The mirror 9 has an aperture 9a and the laser beam is brought to a focus at this aperture by condensing lens 14. Lens 10 receives the laser beam after it has passed through mirror 9 and serves to direct a laser beam of reduced cross-section on to the mirror 11, from which it is directed onto the patient's eye. The aperture 9a in the mirror 9 appears on the retina as a dark spot in an area illuminated by the light from source 5, and is used as an aiming mark. The lens 15 of the patient's eye brings the laser beam to a second focus on the retina.

By bringing the optical axes of the light beam from source 5 and the laser beam into coincidence the laser beam is always coincident with the aiming spot irrespective of whether or not any accidental movement of the laser, mirrors or lenses takes place.

Any focussing or de-focussing of the laser beams to vary the size of the laser beam is accomplished by moving lens 10. Thus in a typical example the laser beam can be reduced from 6 mm. diameter to 2½ mm.

The lenses 10, 14 and the mirror 11 which direct the laser beam need to be high quality components.

Opposite outlet aperture 12 is an observation aperture 16 through which an observer can view the patient's eye. The aperture 16 is offset from the aperture 12 so that no substantial reflection of the laser beam can fall on the observer's eye. To correct for defects in the eye of the patient and/or observer a lens rack 17 is provided which contains a plurality of correcting lenses 18, any one of which can be positioned in the aperture 16 at any given time. Lenses 18 are not in the path of the laser beam and can therefore be of normal ophthalmic quality.

The observer first of all chooses a correcting lens which gives him a well focussed view of the region of the retina which is to be treated. The lens 10 is then adjusted until a sharp image of the aperture 9a is obtained. The laser beam is then in focus on the retina. A typical lens 10 has a focal length of 1 inch and lens 14 a focal length of 2½ inches. These dimensions given an aiming spot size of 0.6 mm. on the retina and this will also be the size of laser beam at the retina.

Whilst the invention has been described with particular reference to a laser ophthalmoscope it can be used with any laser instrument for treating human or animal tissue.

I claim:

1. An instrument for laser beam treatment comprising a laser, a light source, and an optical system co-operating with said light source to generate an illuminating beam for illuminating a target area, wherein:

said optical system includes a reflector having a light-transmitting region arranged to remove part of the illuminating beam and thereby produce an unilluminated aiming spot within the illuminated target area, and means are provided for focussing a laser beam emitted by said laser in the said light-transmitting region and directing said laser beam to follow the path of said illuminating beam whereby the laser beam and the aiming spot are brought to a common focus.

2. An instrument as claimed in claim 1 wherein:
said reflector is a mirror, and
said light-transmitting region is an aperture in the mirror.

3. An instrument as claimed in claim 1 wherein said optical system includes means for forming a parallel beam of light from said lamp and causing said parallel beam to fall on said reflector.

4. An instrument as claimed in claim 3 wherein said optical system further includes means for forming an image of the light-transmitting region in the target area.

5. An instrument as claimed in claim 4 including a second reflector for directing the illuminating beam and the laser beam towards the target area, said means for forming an image of the light-transmitting region serving also to focus said parallel beam on said second reflector.

6. An instrument as claimed in claim 1 in which said optical system comprises, in order between the light source and the target area,
(a) lens means for forming a parallel beam
(b) a mirror
(c) said reflector with a light-transmitting region
(d) a lens for forming an image of the light-transmitting region in the target area, and
(e) a second reflector for directing the illuminating beam and laser beam towards the target area, said lens (d) focussing said parallel beam on said second reflector.

7. An instrument as claimed in claim 1 including an observation aperture and a rack of lens for insertion in said aperture to correct eye defects of the patient or the observer.

References Cited

UNITED STATES PATENTS 3,096,767   7/1963   Gresser et al. _____ 128—395

L. W. TRAPP, Primary Examiner

U.S. Cl. X.R.

128—395; 356—138